G. B. MORTON.
Knot-Tier for Grain-Binder.

No. 217,812. Patented July 22, 1879.

WITNESSES
Saml R. Turner
J. B. Holderby

INVENTOR
George B. Morton
By R. S. & A. P. Lacey
ATTORNEYS

UNITED STATES PATENT OFFICE.

GEORGE B. MORTON, OF MEMPHIS, TENNESSEE, ASSIGNOR OF ONE-THIRD HIS RIGHT TO THOMAS H. ARNOLD, OF SAME PLACE.

IMPROVEMENT IN KNOT-TIERS FOR GRAIN-BINDERS.

Specification forming part of Letters Patent No. 217,812, dated July 22, 1879; application filed April 3, 1879.

*To all whom it may concern:*

Be it known that I, GEORGE B. MORTON, of Memphis, in the county of Shelby and State of Tennessee, have invented certain new and useful Improvements in Knot-Tiers for Harvesting-Machines; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has for its object to furnish a device for tying a knot of ordinary form, and which may be attached to grain-binders or other machines in which such mechanism is employed.

Figure 1:
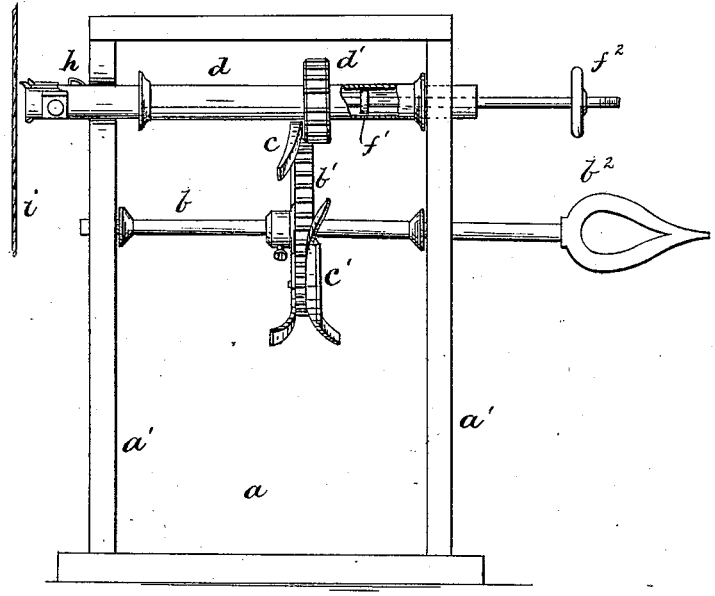
Figure 2:
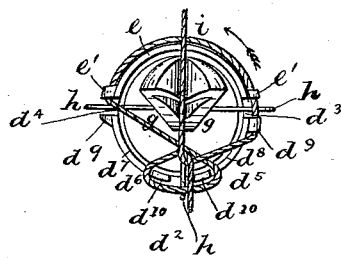
Figure 3:
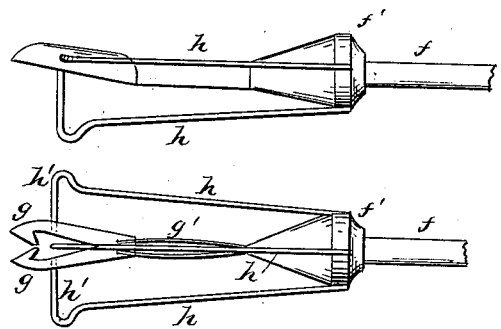
Figure 5:
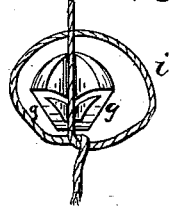
Figure 4:
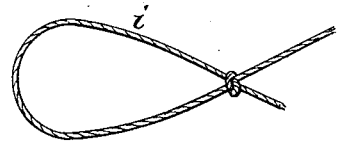

In the drawings, Figure 1 is a side elevation of my improved tying mechanism. Fig. 2 is an end view of the hinged jaws and the looping-shaft with the cord looped around it. Fig. 3 shows the jaws with their attached mechanism. Fig. 4 is the knot tied by my device, and Fig. 5 shows the loop after it is pushed off the end of the shaft.

$a$ is a suitable frame for supporting the mechanism of my invention. Journaled in the uprights $a'$ is the shaft $b$, on which is fixed the gear $b^1$, which drives the tying mechanism. The shaft $b$ is driven by a suitable pulley, gear, or other device placed on its end $b^2$, and connected by belt or otherwise with the machinery of the harvester.

$c\ c'$ are two cams affixed to and on opposite sides of the gear $b^1$. They are arranged so as to engage the pinion and give a to-and-fro movement to the looping-shaft, and at the same time keep the latter continually revolving. The cam $c$ extends about half-round the gear, and is designed to hold the looping-shaft steadily in position while the knot is being tied. The cam $c'$ is shorter than cam $c$, and is of such length that, after it has thrown the looping-shaft forward to grasp the cord, it will hold said shaft in position until the said cord is looped, as hereinafter explained.

$d$ is the hollow looping-shaft, journaled in the frame $a$, so that it can be moved to and fro in its bearings. It has fixed on it the pinion $d^1$, which meshes with the gear $b^1$, and is engaged by the cams $c\ c'$, and is thereby given a revolving and a to-and-fro movement in its bearings. It has formed in its forward or looping end the longitudinal guide-slots $d^2$ $d^3$ $d^4$. The ends of the sections $d^5$ $d^6$ between the guide-slots are cut away, forming recesses or notches $d^7$ $d^8$ and projecting points $d^9$ $d^{10}$, which are turned outward sufficiently to hold the cord, after being looped around, from slipping off the shaft $d$.

The section $e$ is not cut away, but has formed on it the retaining-points $e'\ e'$, arranged at the edges next the slots $d^3$ $d^4$.

Within the hollow shaft $d$, I place another shaft, $f$. The shaft $f$ revolves with, but has a to-and-fro movement independent of, the shaft $d$. It is supported centrally in the latter by suitable guides $f^1$, and it is caused to move to and fro by any suitable cam or other device connected with and acting on its extended end $f^2$.

On the forward end of the shaft $f$ are affixed two hooks or jaws, $g\ g$, which are fixed and held together by springs $g'$, so that they will readily open to receive the binding-cord.

$h$ are three rods, the inner ends of which are fixed to the shaft $f$, while their outer ends are extended nearly to the outer points of the jaws $g$, and are bent inward, as shown, so as to provide shoulders $h'$, which engage the binding-cord $i$ and push the latter off the end of the hollow shaft $d$. They are so formed that they project through the slots $d^2$ $d^3$ $d^4$, and they serve as guides to give steadiness to the forward and back movements of shaft $f$, and hold the latter so that it revolves simultaneously with the shaft $d$.

I have not illustrated my device as tying a knot on the ends of the band after the latter has been passed around a gavel. To do this would require the representation and description of much machinery not pertinent to my invention. I have therefore confined my illustrations and descriptions to the special mechanism of the invention and to the tying of the knot on a single cord.

The device, by means of suitable gavelers, tension and cutting devices, and other mechanism, may readily be adapted to use in harvesters.

In the operation of the invention the cord $i$ is drawn vertically before the end of the shaft $d$. The latter, being revolved in the direction of the arrow, Fig. 2, is at the proper moment thrown forward by the cam $c'$ on gear $b^1$ striking the pinion $d^1$. The cord $i$ is caught in the notches $d^7 d^8$, and is, by the further revolution, wound or looped around the end of the shaft, being held from slipping off by the points $d^9$ and $e'$. After the proper revolution of the shaft the cord will be looped around the shaft and locked, as shown in Fig. 2. Just as the cord passes around the point $d^9$ the cam $c'$ clears the pinion $d^1$, and the latter is then engaged by the cam $c$, and the shaft $d$ is thrown to the right and away from the ends or portions of the cord held vertically before the device, and a slight further revolution makes the lock between the two ends of the cord, as shown. This being completed, the jaws $g$ are pushed out of the shaft $d$ and catch the upper end of the cord, and at the same time, and by the outward movement of the shaft $f$, the shoulders $h'$ push the cord $i'$ over the points $e'$ $d^9$ and off the end of the shaft $d$. The cord being released, the slack is taken up till the cord is drawn into the shape shown in Fig. 5, at which time the jaws $g$ are drawn into the shaft $d$ and the upper end of the cord is drawn through the loop and the ordinary bow-knot (shown in Fig. 5) is tied.

By means of clamps, cutting apparatus, and tension mechanism the band after being tied may be released from the gavel and brought into position before the shaft $d$, preparatory for the tying of the next knot.

Having thus described my invention, what I claim, and desire to secure by Letters Patent, is—

1. The hooks or jaws $g$, supported on elastic spring-shanks $g'$, and the elastic angle rods or pushers $h$, affixed on the end of the shaft $f$, having guides $f^1 f^2$, all arranged as described, and adapted to be placed within a hollow revolving looping-shaft, and operated substantially as and for the purpose set forth.

2. The combination, with the hollow looping-shaft $d$, having longitudinal slots $d^2 d^3 d^4$ and points or fingers for catching and holding the cord, of the elastic or spring jaws $g$ and elastic pushers $h$, affixed on the shaft $f$, having suitable guides and placed in, with capability of a lateral movement independent of, the hollow shaft $d$, substantially as and for the purposes specified.

3. The combination, with the shaft $d$, provided with the pinion $d^1$, of the gear $b^1$, having the cams $c$ $c'$, arranged as described, and supported on axle $b$, substantially as and for the purposes set forth.

In testimony that I claim the foregoing as my own I affix my signature in presence of two witnesses.

GEORGE B. MORTON.

Witnesses:
T. M. S. RHETT,
T. W. BROWN.